US009538001B2

(12) United States Patent
Okuyama

(10) Patent No.: US 9,538,001 B2
(45) Date of Patent: Jan. 3, 2017

(54) COMMUNICATION TERMINAL, COMMUNICATION MANAGEMENT SYSTEM, COMMUNICATION SYSTEM, AND RECORDING MEDIUM

(71) Applicant: Taro Okuyama, Tokyo (JP)

(72) Inventor: Taro Okuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 145 days.

(21) Appl. No.: 14/483,789

(22) Filed: Sep. 11, 2014

(65) Prior Publication Data

US 2015/0071130 A1 Mar. 12, 2015

(30) Foreign Application Priority Data

Sep. 11, 2013 (JP) ................................. 2013-188432

(51) Int. Cl.
| | |
|---|---|
| *H04L 29/00* | (2006.01) |
| *H04M 3/42* | (2006.01) |
| *H04M 7/00* | (2006.01) |
| *H04N 7/14* | (2006.01) |

(52) U.S. Cl.
CPC ....... *H04M 3/42102* (2013.01); *H04M 7/0075* (2013.01); *H04N 7/147* (2013.01)

(58) Field of Classification Search
CPC . H04M 3/42102; H04M 7/0075; H04N 7/147; H04W 4/005; H04W 4/008; H04W 72/048; H04W 72/02; H04W 84/18; H04W 68/00; H04W 12/08; H04W 8/26; G01D 5/00; H04L 67/12
See application file for complete search history.

(56) References Cited

U.S. PATENT DOCUMENTS

| | | | |
|---|---|---|---|
| 2004/0133448 A1* | 7/2004 | Higashi | G06F 21/10 726/30 |
| 2008/0052535 A1* | 2/2008 | Spohrer | H04M 3/42221 713/193 |
| 2008/0065733 A1* | 3/2008 | Umetsu | G06F 11/3495 709/206 |

(Continued)

FOREIGN PATENT DOCUMENTS

| | | |
|---|---|---|
| GB | 2 398 198 A | 8/2004 |
| JP | 10-126484 | 5/1998 |

(Continued)

OTHER PUBLICATIONS

Extended European Search Report issued Jan. 27, 2015 in Patent Application No. 14184171.8.

*Primary Examiner* — Mohamed Kamara
(74) *Attorney, Agent, or Firm* — Oblon, McClelland, Maier & Neustadt, L.L.P.

(57) ABSTRACT

A communication terminal accepts a communication start request for starting communication with a counterpart terminal indicated by counterpart information, through one of a first acceptance unit and a second acceptance unit. The communication terminal stores the counterpart information of the counterpart terminal in a first memory as log data, when the communication start request is accepted through the first acceptance unit, and prevents the counterpart information of the counterpart terminal from being stored in the first memory as log data, when the communication start request is accepted through the second acceptance unit.

10 Claims, 14 Drawing Sheets

(56) References Cited

U.S. PATENT DOCUMENTS

2011/0246644 A1  10/2011  Hamada
2013/0223292 A1   8/2013  Okuyama et al.
2014/0245082 A1*  8/2014  Halverson ........... G06F 11/3072
                                               714/49

FOREIGN PATENT DOCUMENTS

JP      2006-067192       3/2006
JP      2006-287556      10/2006
JP      2009-118313       5/2009

* cited by examiner

FIG. 6

CALL LOG MANAGEMENT TABLE

| TIME | COUNTERPART INFORMATION |
|---|---|
| 8/30 14:00 | 10ac@example.com |
| 8/29 17:30 | 10ae@example.com |
| 8/29 10:30 | 10ag@example.com |
| 8/27 12:30 | 10ab@example.com |
| 8/27 09:30 | 10ag@example.com |

FIG. 7

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 8

TERMINAL MANAGEMENT TABLE

| TERMINAL ID | NAME | OPERATION STATE | COUNTERPART INFORMATION |
|---|---|---|---|
| 01aa | JAPAN TOKYO OFFICE AA TERMINAL | ONLINE | 10aa@example.com |
| ... | ... | ... | ... |
| 01ba | JAPAN OSAKA OFFICE BA TERMINAL | ONLINE | 10ba@example.com |
| ... | ... | ... | ... |
| 01ca | U.S. NY OFFICE CA TERMINAL | ONLINE | 10ca@example.com |
| ... | ... | ... | ... |
| 01db | U.S. WASH, D.C. OFFICE DB TERMINAL | OFFLINE | 10db@example.com |

FIG. 9

CANDIDATE LIST MANAGEMENT TABLE

| STARTING TERMINAL ID | COUNTERPART TERMINAL ID |
|---|---|
| 01aa | 01ab, 01ba, 01af, 01bb, 01ca, ..., 01db |
| ... | ... |
| 01ba | 01aa, 01db |
| ... | ... |
| 01db | 01aa, 01ba, 01ca |
| ... | ... |

COMMUNICATION TERMINAL, COMMUNICATION MANAGEMENT SYSTEM, COMMUNICATION SYSTEM, AND RECORDING MEDIUM

CROSS-REFERENCE TO RELATED APPLICATIONS

This patent application is based on and claims priority pursuant to 35 U.S.C. §119(a) to Japanese Patent Application No. 2013-188432, filed on Sep. 11, 2013, in the Japan Patent Office, the entire disclosure of which is hereby incorporated by reference herein.

BACKGROUND

Technical Field

The present invention generally relates to managing counterpart terminals for a communication terminal.

Description of the Related Art

Communication systems that perform communication via a communication network such as the Internet or a dedicated line have become popular in recent years due to a demand for reducing business trip costs and time. To start communication in the communication system, the user at the communication terminal enters counterpart information, such as a phone number or an address of the counterpart terminal. The counterpart information, which is entered by the user, is usually stored as a log in a memory at the communication terminal, to allow the user to call the counterpart information from the next time.

SUMMARY

Example embodiments of the present invention include a communication terminal, which accepts a communication start request for starting communication with a counterpart terminal indicated by counterpart information, through one of a first acceptance unit and a second acceptance unit. The communication terminal stores the counterpart information of the counterpart terminal in a first memory as log data, when the communication start request is accepted through the first acceptance unit, and prevents the counterpart information of the counterpart terminal from being stored in the first memory as log data, when the communication start request is accepted through the second acceptance unit.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is an example data structure of a call log management table;

FIG. 7 is an example data structure of an authentication management table;

FIG. 8 is an example data structure of a terminal management table;

FIG. 9 is an example data structure of a candidate list management table;

Figure 1:
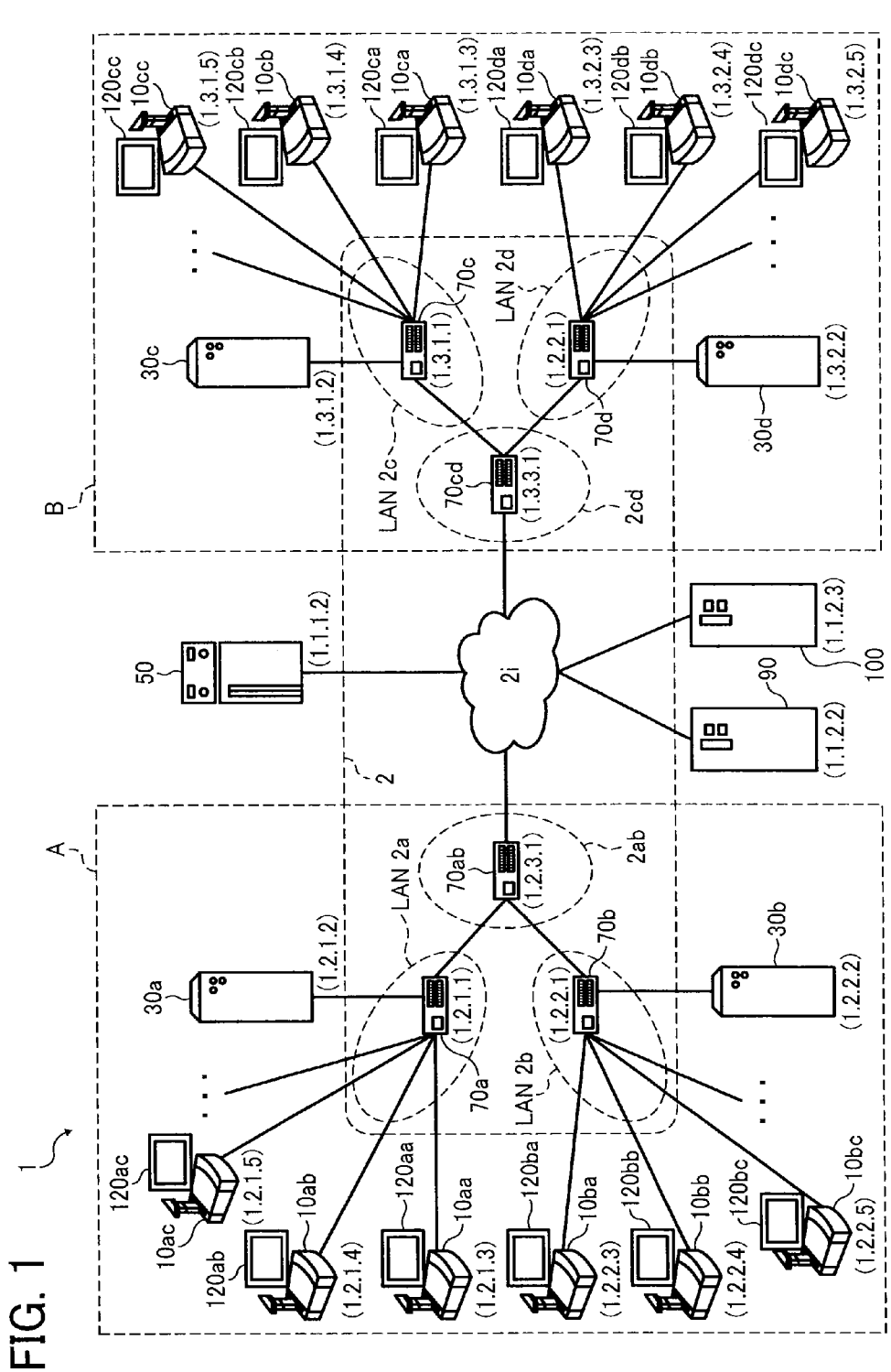
FIG. 1 is a schematic block diagram illustrating a configuration of a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

<<Overall Configuration>>

First, the overall configuration of the embodiment will be described referring to FIG. 1. FIG. 1 is a schematic diagram of a communication system 1 according to the embodiment of the present invention.

The communication system 1 illustrated in FIG. 1 includes a communication system that intercommunicates information between a plurality of communication terminals 10 via a management system 50. In this example, the communication system is a system for intercommunicating information, feelings, or the like between a plurality of communication terminals via a communication management system, and an example thereof includes a video conference system and a videoconference system.

In the embodiment, the communication system, the communication management system, and the communication terminals will be described while assuming a videoconference system serving as an example of the communication system, a videoconference management system serving as the communication management system, and videoconference terminals serving as an example of the communication terminals. That is, the communication terminal and the communication management system according to the embodiment of the present invention are applied not only to a videoconference system, but also to another communication system. Although the example in the embodiment is described as a "videoconference", this may alternatively be any other video communication.

The communication system 1 illustrated in FIG. 1 includes a plurality of communication terminals (10aa, 10ab, . . . ), displays (120aa, 120ab, . . . ) for the respective communication terminals (10aa, 10ab, . . . ), a plurality of relay devices (30a, 30b, 30c, and 30d), the communication management system 50, a program providing system 90, and a maintenance system 100. The plurality of communication terminals 10 perform communication by transmitting and receiving image data and sound data serving as examples of content data.

Hereinafter, the "communication management system" may simply be represented as the "management system". The "communication terminal" may simply be represented as the "terminal". In addition, an arbitrary one or ones of the plurality of terminals (10aa, 10ab, . . . ) is/are represented as a "terminal(s) 10". An arbitrary one or ones of the plurality of displays (120aa, 120ab, . . . ) is/are represented as a "display(s) 120". An arbitrary one or ones of the plurality of relay devices (30a, 30b, 30c, and 30d) is/are represented as a "relay device(s) 30".

The relay devices 30 illustrated in FIG. 1 relay content data between the plurality of terminals 10. The management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. In addition, the HD 204 of the program providing system 90 stores a relay device program for causing a relay device 30 to realize various functions (or for causing a relay device 30 to function as various elements), and the relay device program can be transmitted to the relay device 30. Further, the HD 204 of the program providing system 90 stores a communication management program for causing the management system 50 to realize various functions (or for causing the management system 50 to function as various elements), and the communication management program can be transmitted to the management system 50.

The maintenance system 100 is a computer for performing maintenance, management, or conservation of at least one of the terminals 10, the relay devices 30, the management system 50, and the program providing system 90. For example, in the case where the maintenance system 100 is located in one country, and the terminals 10, the relay devices 30, the management system 50, or the program providing system 90 is/are located outside that country, the maintenance system 100 remotely performs, via a communication network 2, maintenance, management, or conservation of at least one of the terminals 10, the relay devices 30, the management system 50, and the program providing system 90. In addition, the maintenance system 100 performs maintenance such as management of the model number, serial number, sales contact, maintenance checkup, or a past history of failures of at least one of the terminals 10, the relay devices 30, the management system 50, and the program providing system 90 without having the communication network 2 therebetween.

The terminals (10aa, 10ab, 10ac, . . . ), the relay device 30a, and the router 70a are connected to be communicable with each other by a local area network (LAN) 2a. The terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab, thereby configuring a communication network within a certain range. The certain range is, for example, a region such Japan. For example, the LAN 2a in FIG. 1 is configured in offices in Tokyo, and the LAN 2b is configured in offices in Osaka.

The terminals (10ca, 10cb, 10cc, . . . ), the relay device 30c, and the router 70c are connected to be communicable with each other by a LAN 2c. The terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd, thereby configuring a communication network within a certain range. The certain range is, for example, a region such as the U.S. The LAN 2c in FIG. 1 is configured in offices in New York, and the LAN 2d is configured in offices in Washington, D.C. The area A and the area B are connected to be communicable with each other from the routers (70ab and 70cd), respectively, via the Internet 2i.

In addition, the management system 50 and the program providing system 90 are connected to be communicable with the terminals 10 and the relay devices 30 via the Internet 2i. The management system 50 and the program providing system 90 may be located in the A or B, or may be located in other areas.

In the embodiment, the communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired network, but also a network where communication is performed wirelessly, such as Wireless Fidelity (WiFi) or Bluetooth (registered trademark).

In FIG. 1, four digits indicated below each of the terminals 10, each of the relay devices 30, the management system 50, each of the routers 70, and the program providing system 90 indicates an IP address in an abbreviated form in the general Internet Protocol version 4 (IPv4). For example, the IP address of the terminal 10aa is "1.2.1.3". Although IPv6 may be used instead of IPv4, IPv4 is used in order to make the description simple.

Note that the terminals 10 may be used not only for communication between different companies or different branches or for communication between different rooms in the same company or branch, but also for communication within the same room or for outdoor-indoor communication or outdoor-outdoor communication. In the case where the terminals 10 are used outside, wireless communication using a cellular phone communication network or the like is performed.

<<Hardware Configuration>>

Figure 2:
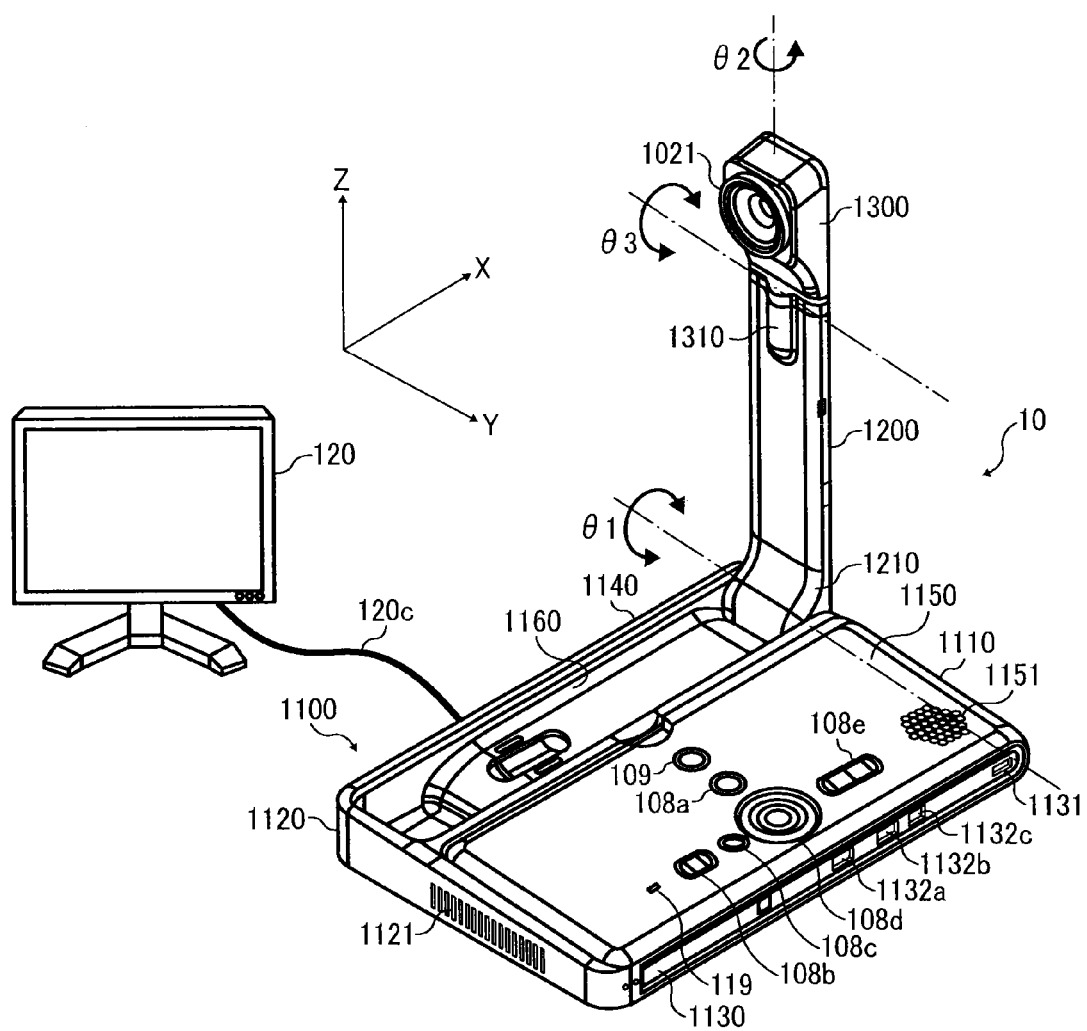
FIG. 2 is an illustration of an outer appearance of a communication terminal of the communication system of FIG. 1, according to an example embodiment of the present invention.

The hardware configuration of the embodiment will be described. FIG. 2 is an external view of a terminal 10 according to the embodiment of the present invention. The description will be given assuming that the longitudinal direction of the terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 2, the terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the terminal 10 can be taken in via the inlet face and exhausted to the rear of the terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e), a power switch 109, and an alarm lamp 119, which are formed thereon. In addition, the operation panel 1150 has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. A connection port for electrically connecting a cable 120c for a display 120 to the external device connection I/F 118 described later is provided on the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 and is configured to be rotatable in the vertical direction within the range of a tilt angle θ1 of 135 degrees with respect to the casing 1100. FIG. 2 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the arm 1200, in which the state illustrated in FIG. 2 serves as 0 degrees.

Since the relay devices 30, the management system 50, the program providing system 90, and the maintenance system 100 each have the same appearance as that of a general server computer, descriptions of the appearances thereof are omitted.

Figure 3:
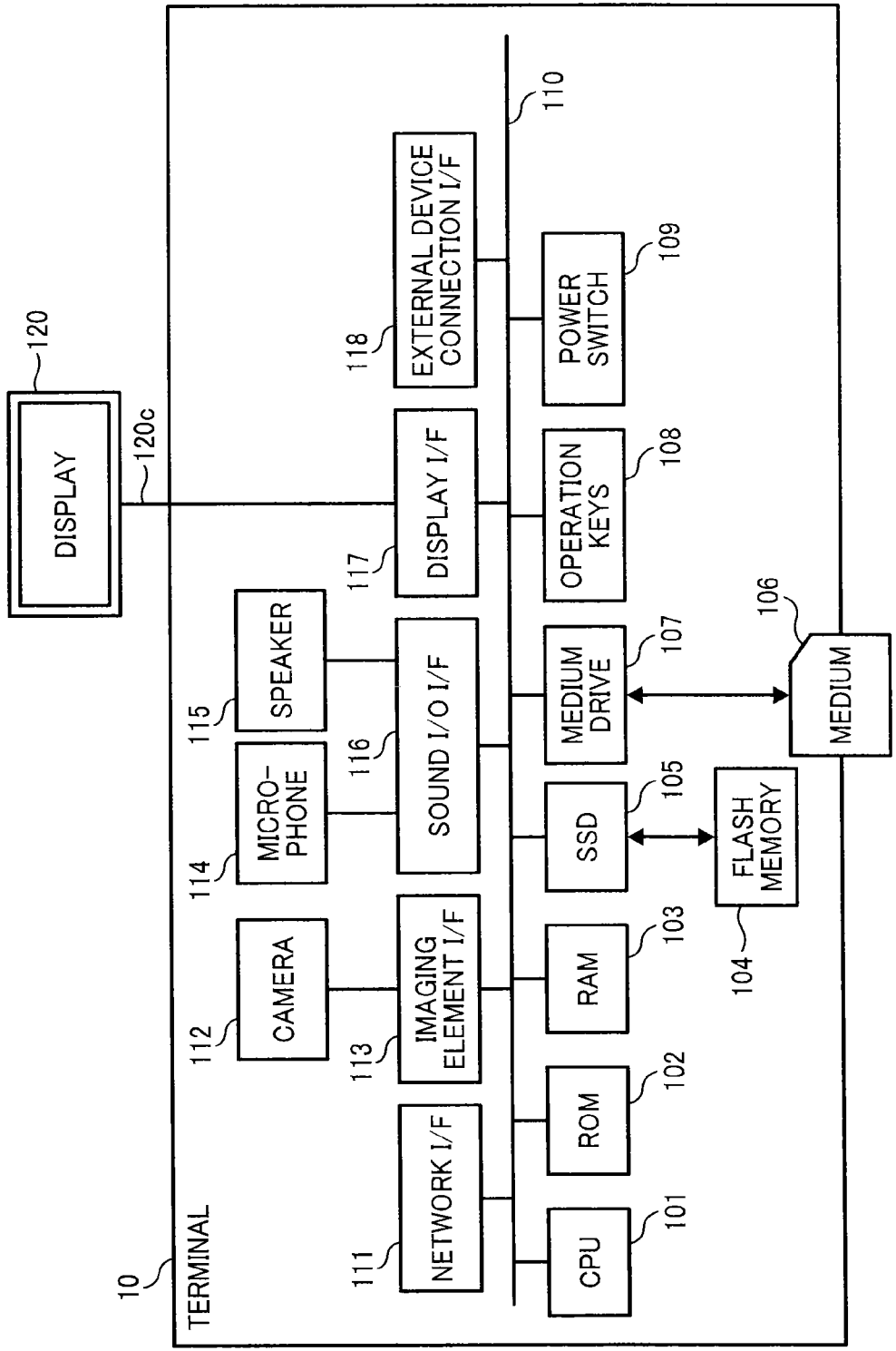
FIG. 3 is a schematic block diagram illustrating a hardware structure of the communication terminal of FIG. 2, according to an example embodiment of the present invention.

FIG. 3 is a hardware configuration diagram of the terminal 10 according to the embodiment of the present invention. As illustrated in FIG. 3, the terminal 10 includes a central processing unit (CPU) 101 that controls the overall operation of the terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the terminal program, image data, and sound data, a solid state drive (SSD) 105 that controls reading/writing of various types of data from/to the flash memory 104 under control of the CPU 101, a medium drive 107 that controls reading/writing (storage) of data from/to a carrier medium 106 such as a flash memory, the operation keys 108 operated in the case of, for example, selecting a counterpart terminal for the terminal 10, the power switch 109 for turning ON/OFF the power of the terminal 10, and a network interface (I/F) 111 for transmitting data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 2 in order to connect various external devices, and a bus line 110 such as an address bus and a data bus for electrically connecting the above-described elements as illustrated in FIG. 3.

The display 120 is a display element formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be recorded in a file in an installable format or an executable format on a computer-readable recording medium such as the recording medium 106 and distributed. In addition, the terminal program may be stored on the ROM 102, instead of the flash memory 104.

Figure 4:
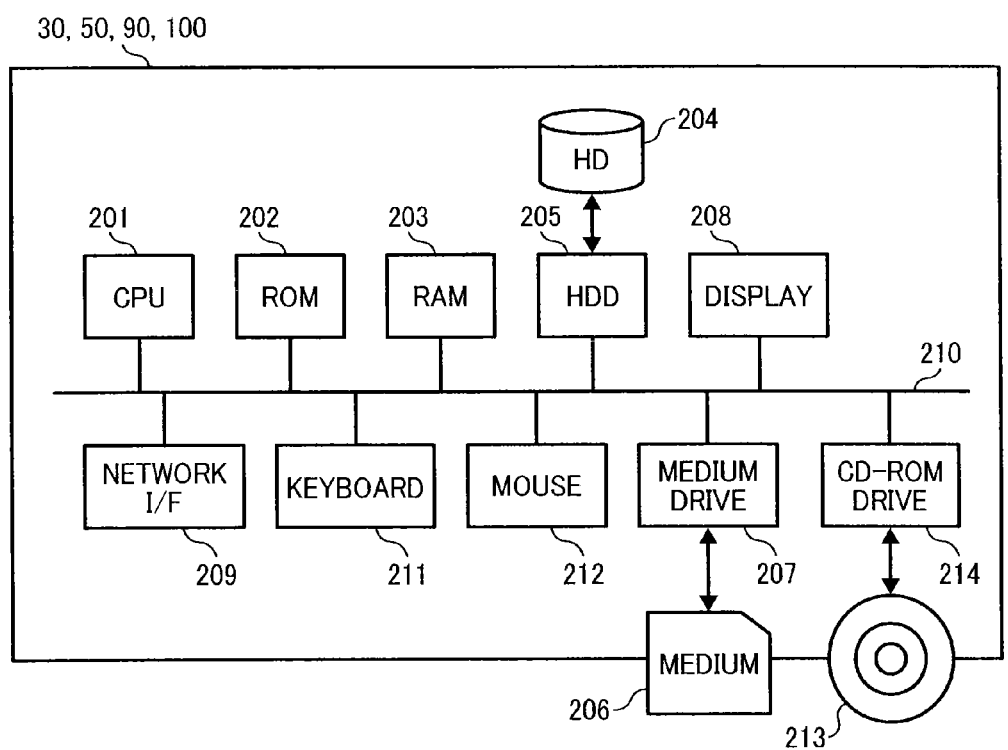
FIG. 4 is a schematic block diagram illustrating a hardware structure of any one of a communication management system, relay device, program providing system, and maintenance system of the communication system of FIG. 1, according to an example embodiment of the present invention.

FIG. 4 is a hardware configuration diagram of the management system 50 according to the embodiment of the present invention. The management system 50 includes a CPU 201 that controls the overall operation of the management system 50, a ROM 202 that stores a program used for controlling the CPU 201, such as an IPL, a RAM 203 used as a work area for the CPU 201, the HD 204, which stores various types of data, such as the communication management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements as illustrated in FIG. 4.

Note that the communication management program may be recorded in a file in an installable format or an executable format on a computer-readable recording medium such as the recording medium 206 or the CD-ROM 213 and distributed. In addition, the communication management program may be stored on the ROM 202, instead of the HD 204.

In addition, since the relay devices 30 have a hardware configuration that is the same as or similar to that of the above-described management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

In addition, since the program providing system 90 and the maintenance system 100 each have a hardware configuration that is the same as or similar to that of the above-described management system 50, descriptions thereof are omitted. Note that the HD 204 stores a program providing program for controlling the program providing system 90, or a maintenance program. Also in this case, the program providing program or the maintenance program may be recorded in a file in an installable format or an executable format on a computer-readable recording medium such as the recording medium 206 or the CD-ROM 213 and distributed. In addition, the program providing program or the maintenance program may be stored on the ROM 202, instead of the HD 204.

Note that each of the above-described programs may be recorded on a computer-readable recording medium such as a compact disc recordable (CD-R), a digital versatile disk (DVD), or a Blue-ray disk, which serve as other examples of the above-described removable recording medium, and may be provided.

<<Functional Configuration>>

Figure 5:
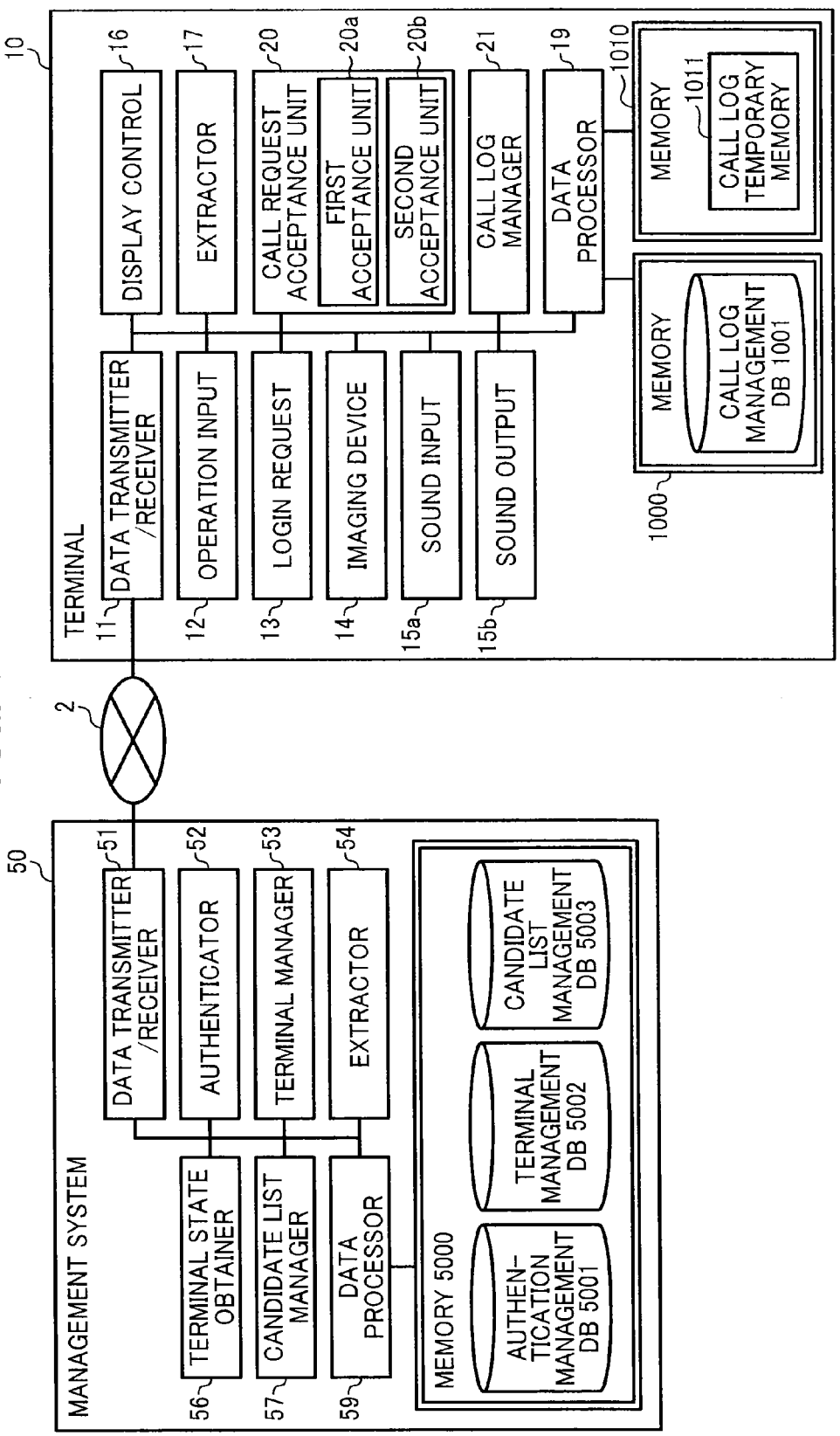
FIG. 5 is a schematic block diagram illustrating a functional structure of the communication terminal and the communication management system of the communication system of FIG. 1, according to an example embodiment of the present invention.

Next, the functional configuration of the embodiment of the present invention will be described. FIG. 5 is a functional block diagram of the terminal 10 and the management system 50 included in the communication system 1 of the embodiment of the present invention. In FIG. 5, the terminal 10 and the management system 50 are connected to be capable of communicating data via the communication network 2. For simplicity, the program providing system 90 is omitted in FIG. 5.

<Functional Configuration of Terminal>

The terminal 10 includes a data transmitter/receiver 11, an operation input 12, a login request 13, an imaging device 14, a sound input 15a, a sound output 15b, a display control 16, an extractor 17, a call request acceptance unit 20, a call log manager 21, and a data processor 19. These elements are functions that are realized by or elements that are caused to function by any of the hardware structure illustrated in FIG. 3 that is/are caused to operate in response to a command from the CPU 101 in accordance with the terminal program expanded from the flash memory 104 to the RAM 103.

The terminal 10 further includes a volatile memory 1010 implemented by the RAM 103, and a nonvolatile memory 1000 implemented by the flash memory 104 illustrated in FIG. 3.

(Call Log Management Table)

The nonvolatile memory 1000 includes a call log management DB 1001, which stores a call log management table of FIG. 6. The call log management table of FIG. 6 stores, for each call request received from the terminal 10, the time when a call request is accepted at the terminal 10, and counterpart information indicating a counterpart terminal that is requested by the terminal 10 to start communication. For example, referring to FIG. 6, it is indicated that a call request is accepted at 14:00, Aug. 30, 2014, which requests to call the counterpart terminal indicated by the counterpart information "10ac@example.com". The counterpart information may be, for example, address information of the counterpart terminal.

(Call Log Temporary Memory)

The nonvolatile memory 1010 has a call log temporary memory area 1011, which temporarily stores counterpart information for a call request that is just accepted at the terminal 10. When a new call request is received, the counterpart information stored in the call log temporary memory 1011 is overwritten with new counterpart information for the new call request. Further, the counterpart information stored in the call log temporary memory 1011 is deleted, as the terminal 10 is turned off.

Referring now to FIGS. 3 to 5, a functional structure of the terminal 10 is explained. In the following description of functional structure of the terminal 10, among elements illustrated in FIG. 3, relationships with main elements for realizing functional structure of the terminal 10 will also be described.

The data transmitter/receiver 11 of the terminal 10 illustrated in FIG. 5 is realized by a command from the CPU 101 illustrated in FIG. 3 and by the network I/F 111 illustrated in FIG. 3, and performs transmission/reception of various types of data (or information) to/from another terminal, apparatus, or system via the communication network 2.

The operation input 12 is realized by a command from the CPU 101 illustrated in FIG. 3 and by the operation keys 108 and the power switch 109 illustrated in FIG. 3, and accepts various inputs from the user. For example, as the power switch 109 (FIG. 3) is turned on, the operation input 12 turns on the power of the terminal 10. In this example, the operation input 12 may function as a user interface, which interacts with the user.

The login request 13 is realized by a command from the CPU 101 illustrated in FIG. 3, and automatically transmits, from the data transmitter/receiver 11 to the management system 50 via the communication network 2, login request information indicating a login request and the current IP address of a starting terminal, as the terminal 10 is turned on. In addition, when the user selects the power switch 109 from on to off, the data transmitter/receiver 11 transmits to the management system 50 state information indicating that the power is turned off, and then the operation input 12 completely turns off the power. Accordingly, the management system 50 can detect that the power of the terminal 10 is turned from on to off.

The imaging device 14 is realized by a command from the CPU 101 illustrated in FIG. 3 and by the camera 112 and the imaging element I/F 113 illustrated in FIG. 3. The imaging device 14 captures an image of a subject and outputs image data obtained by capturing the image.

The sound input 15a is realized by a command from the CPU 101 illustrated in FIG. 3 and by the sound input/output I/F 116 illustrated in FIG. 3. After the voice of the user is converted to a sound signal by the microphone 114, the sound input 15a inputs sound data according to this sound signal. The sound output 15b is realized by a command from the CPU 101 illustrated in FIG. 3 and by the sound input/output I/F 116 illustrated in FIG. 3, and outputs the sound signal according to the sound data to the speaker 115 to cause the speaker 115 to output sound.

The display control 16 is realized by a command from the CPU 101 illustrated in FIG. 3 and by the display I/F 117 illustrated in FIG. 3, and performs control for transmitting image data to the external display 120. For example, to request the user at the terminal 10 to generate a call request, the display control 16 transmits screen data to case the display 120 to display the screen of FIG. 13 or 14 based on the screen data. In this example, the display control 16, together with a screen being displayed on any display, functions as a user interface that interacts with the user. For example, the screen being displayed by the display control 16 may be provided with a touch panel, which allows the user to directly input a user instruction.

The extractor 17, which may be implemented by a command from the CPU 101 of FIG. 3, extracts various data (or information) from the nonvolatile memory 1000 or the volatile memory 1010.

The call request acceptance unit 20, which may be implemented by a command from the CPU of FIG. 3, receives a call request for calling the counterpart terminal that is a call destination, through user operation using the operation key 108. In this example, the call request acceptance unit 20 includes a first acceptance unit 20a and a second acceptance unit 20b. The first acceptance unit 20a accepts a call request with a request for storing a call log, in response to selection of a call key 121a or 121b on the screen of FIG. 13 or 14. The second acceptance unit 20b accepts a call request without a request for not storing a call log, in response to selection of a call key 122 of the screen of FIG. 12 or 13.

In this example, the call key 121a or 121b may function as a first element, and the call key 122 may function as a second element. The first element and the second element may each be displayed with any graphical representation. Further, the second element may have a representation that is associated with information stored in the call log temporary memory 1011. Further, the call key 121b may have a representation that is associated with information stored in the call log management DB 1001.

The call log manager 21, which may be implemented by a command from the CPU 101 of FIG. 3, manages a log of calls, fore example, by storing or deleting a call log to the call log management DB 1001 (FIG. 7) or call log temporary memory 1011.

The data processor 19 is realized by a command from the CPU 101 illustrated in FIG. 3 and by the SSD 105 illustrated in FIG. 3, and performs processing to store various types of data in the memory 1000 or to read various types of data stored in the memory 1000. The memory 1000 stores a terminal identification (ID) serving as an example of identification information for identifying the terminal 10, and a password, which may be used to login the management system. The memory 1000 further stores counterpart information of the other terminal 10. Every time image data and sound data that are received in performing communication with a counterpart terminal are received, the image data and sound data are overwritten in the memory 1000. Among these items of data, on the basis of image data before being overwritten, an image is displayed on the display 120, and, on the basis of sound data before being overwritten, sound is output from the speaker 115.

<Functional Structure of Management System>

The management system 50 includes a data transmitter/receiver 51, an authenticator 52, a terminal manager 53, an extractor 54, a terminal state obtainer 56, a candidate list manager 57, and a memory control 59. These elements are functions that are realized by or elements that are caused to function by any of the hardware configuration illustrated in FIG. 4 that is/are caused to operate in response to a command from the CPU 201 in accordance with the management system program expanded from the HD 204 to the RAM 203. In addition, the management system 50 includes a nonvolatile memory 5000, which keeps various data stored therein even after the management system 50 is turned off, such as the HD 204 illustrated in FIG. 4.

(Authentication Management Table)

The nonvolatile memory 5000 includes an authentication management DB 5001, such as an authentication management table of FIG. 7. The authentication management table stores, for each of the terminals 10 that are managed by the management system, stores a terminal ID for identifying the terminal and a password in association with each other. For example, the authentication management table illustrated in FIG. 6 indicates that the terminal ID of the terminal 10*aa* is "01aa", and the password of the terminal 10*aa* is "aaaa".

In this embodiment, a terminal ID or a relay device ID, which is used as an example of identification information, may be expressed with any language, character(s), symbol (s), or various marks, or a combination of at least two of the above.

(Terminal Management Table)

The nonvolatile memory 5000 stores a terminal management DB 5002, such as a terminal management table of FIG. 8. The terminal management table of FIG. 8 stores, for each one of the terminals 10 managed by the management system 50, the terminal ID of the terminal 10, the name of the terminal 10 that may be used to call the terminal 10, the operation state of the terminal 10, and the counterpart information related to the terminal 10, in association with one another. Using information stored in the terminal management table of FIG. 8, the terminal ID of the terminal 10 may be obtained using the counterpart information transmitted from the terminal 10. Similarly, the counterpart information of the terminal 10 may be obtained using the terminal ID transmitted from the terminal 10. For example, the terminal management table of FIG. 8 indicates that the terminal 10*aa* with the terminal ID "01aa" has the name "Japan, Tokyo Office, AA Terminal", the operation state "online", and counterpart information "10aa@example.com".

(Candidate List Management Table)

The nonvolatile memory 5000 further stores a candidate list management DB, such as a candidate list management table of FIG. 9. The candidate list management table of FIG. 9 stores, for each one of starting terminals capable of starting communication, counterpart terminal IDs of one or more candidate counterpart terminals, which may be requested by the starting terminal, in association with the terminal ID of the starting terminal. The candidate list management table of FIG. 9 indicates that the starting terminal 10*aa* with the terminal ID "01aa" may request to start communication with the terminal 10*ab* with the terminal ID "01ab", the terminal 10*ba* with the terminal ID "01ba", and the terminal 10*bb* with the terminal ID "01bb", etc. The management system 50 may add or delete information regarding the candidate counterpart terminal, according to a user instruction received through any terminal 10. The candidate list management DB 5004 (FIG. 9) may further store a terminal name of the candidate counterpart terminal, to be managed in association with the counterpart terminal ID of the candidate counterpart terminal.

(Functional Structure of Management System)

Next, the functional structure of the management system 50 will be described in detail. In the following description, among elements illustrated in FIG. 4, relationships with main elements for realizing functional configuration of the management system 50 will also be described.

The data transmitter/receiver 51 is realized by a command from the CPU 201 illustrated in FIG. 4 and by the network I/F 209 illustrated in FIG. 4, and performs transmission/reception of various types of data (or information) to/from another terminal, apparatus, or system via the communication network 2.

The authenticator 52 is realized by a command from the CPU 201 illustrated in FIG. 4, and performs authentication by searching the authentication management DB 5001 of the memory 5000 by using a terminal ID and a password included in login request information received via the data transmitter/receiver 51 as search keys and determining whether the same pair of a terminal ID and a password is managed in the authentication management DB 5001.

The terminal manager 53 is realized by a command from the CPU 201 illustrated in FIG. 4. To manage the operation state of a terminal 10 which has given a login request, the terminal manager 53 stores and manages the terminal ID and operation state of the terminal in association with one another in the terminal management DB 5002 (FIG. 8). In addition, on the basis of operation state information sent from the terminal 10 indicating that power is turned off when the power switch 109 of the terminal 10 is turned from on to off, the terminal manager 53 changes the operation state indicating an online state to an offline state in the terminal management DB 5002 (FIG. 8).

The extractor 54 is realized by a command from the CPU 201 illustrated in FIG. 4, and extracts various types of information stored in the memory 5000. In one example, the extractor 54 searches the candidate list management table (FIG. 9) using the terminal ID of a terminal 10 that requests to login, which serves as a starting terminal, as a key to extract the terminal ID of a candidate counterpart terminal 10 for the terminal 10 that requests to login. In another example, the extractor 54 searches the candidate list management DB 5003 (FIG. 9) using the terminal ID of a terminal 10 that requests to login, as a key to extract the terminal ID of the starting terminal 10 that registers the terminal 10 that requests to login as a candidate counterpart terminal.

The terminal state obtainer 56, which may be implemented by a command from the CPU 201 of FIG. 4, searches the terminal management DB 5002 (FIG. 8) using the terminal ID or the terminal name as a search key to obtain the operation state of the terminal. For example, the terminal state obtainer 56 searches the terminal management DB 5002 (FIG. 8) using the terminal ID of a candidate counterpart terminal that is extracted by the extractor 54, as a search key to obtain the operation state of the candidate counterpart terminal. Further, the terminal state obtainer 56 searches the terminal management DB 5002 (FIG. 8) using the terminal ID of the terminal that requests to login, as a search key to obtain the operation state of the terminal 10. Alternatively, the function of the terminal state obtainer 56 may be incorporated in the extractor 54.

The candidate list manager 57, which may be implemented by a command from the CPU 201 of FIG. 4, adds the candidate counterpart terminal ID to be managed in association with the terminal ID of the starting terminal, or deletes the candidate counterpart terminal ID from a record for the starting terminal.

The data processor 59, which may be implemented by a command from the CPU 201 of FIG. 4, in cooperation with the HDD 205 of FIG. 4, stores or reads various data with respect to the nonvolatile memory 5000.

<<Example Operation>>

Figure 10:
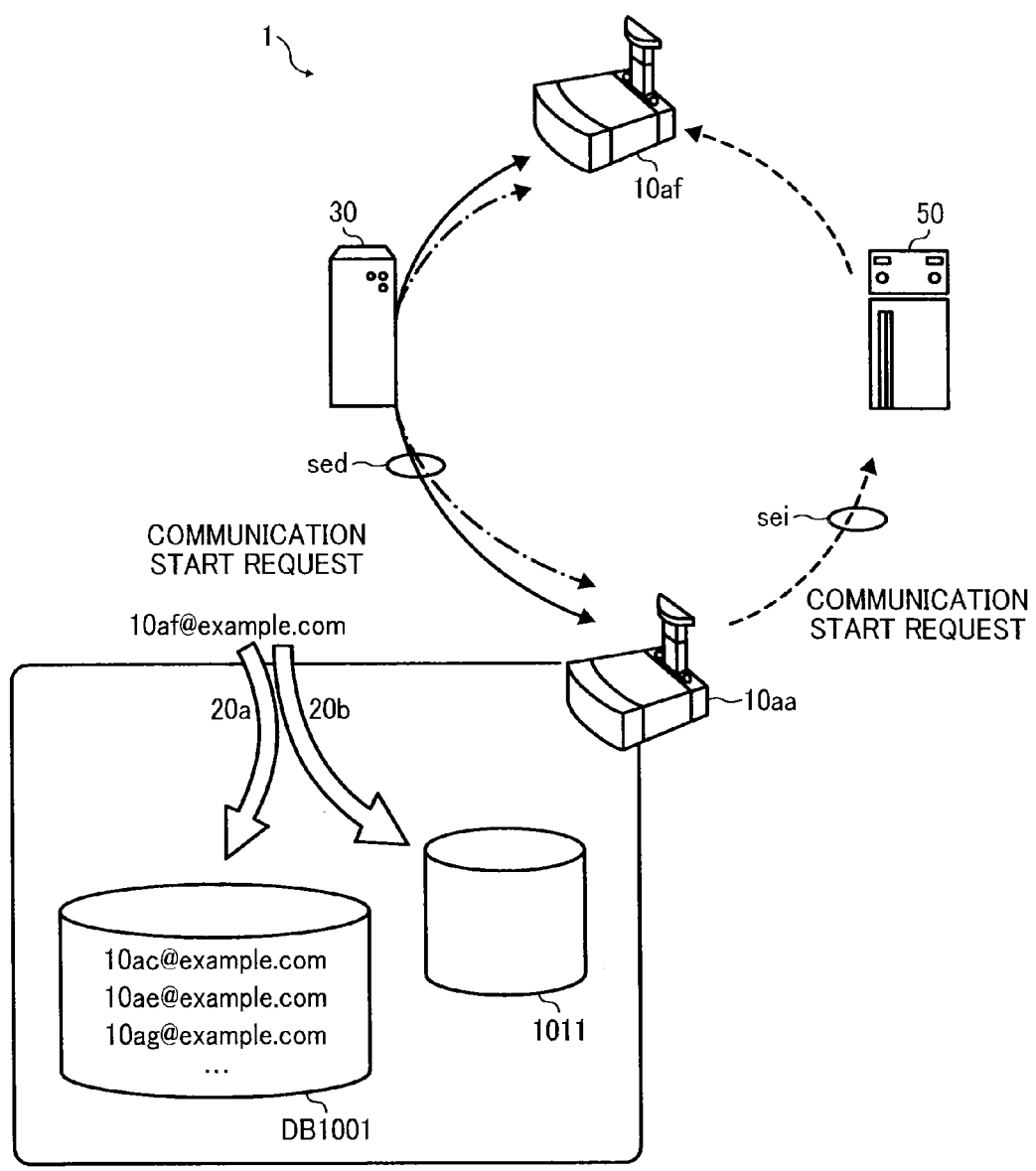
FIG. 10 is an illustration for explaining transmission or reception of various data in the communication system of FIG. 1.

Referring to FIG. 10, operation of managing counterpart terminal information, performed by the management system 50 and the terminal 10, is explained according to an example embodiment of the present invention. FIG. 10 is a conceptual diagram illustrating transmission or reception of various data in the communication system 1.

In the background technology, the counterpart information, which is entered by the user, is usually stored as a log in a memory at the communication terminal, to allow the user to call the counterpart information from the next time. If the number of logs being stored increases, it would be difficult for the user to find counterpart information of a specific counterpart terminal. While the number of logs in the memory may be managed, for example, by deleting the older logs, or by deleting the log for the counterpart terminal having its counterpart information previously stored, such management automatically performed at the terminal side may not always improve the user operability. For example, the terminal may keep storing counterpart information for the counterpart terminal that the user rarely communicates, or keep storing counterpart information for the counterpart terminal that the user does not want to store at all for the security reasons. In view of this, the following example allows the user to select whether to store counterpart information as log data, at the time the user requests to start communication with the counterpart terminal.

The terminal 10*aa* is provided with a plurality of acceptance units, each of which may receive a communication start request ("call request") for starting communication with the counterpart terminal 10*af*, that is the communication destination. In this example, the first acceptance unit 20*a* and the second acceptance unit 20*b* are provided. When a call request is received at the first acceptance unit 20*a*, the management system 50 stores counterpart information indicating a communication destination, in the call log management DB 1001. When a call request is received at the second acceptance unit 20*b*, the management system 50 does not store counterpart information indicating a communication destination in the call log management DB 1001. In response to a call request, which is received at the first acceptance unit 20*a* or the second acceptance unit 20*b*, the data transmitter/receiver 11 of the terminal 10*aa* transmits the call request (communication start request) that requests to start communication with the counterpart terminal 10*af* to the management system 50.

At the time of requesting for call, the user is able to select whether to store a log of the call to be requested, or not to store a log of the call to be requested, through selecting the first acceptance unit 20*a* or the second acceptance unit 20*b*. With this configuration, the user may chose not to store a log of the call to be requested, when the user thinks that counterpart information related to that call should not be stored at all, for example, for the security reasons. Further, the user may chose not to store a log of the call to be requested, when the user thinks that the counterpart information related to that call is not most likely to be used again.

When the call request is received at the second acceptance unit 20*b*, the call log temporary memory area 1011 of the nonvolatile memory 1010 temporarily stores the counterpart information indicating a communication destination of the requested call. The counterpart information, which is temporarily stored, may be used by the user to send a call request addressing to the same counterpart terminal. In response to the call request, which is received at the second acceptance unit 20*b*, the data transmitter/receiver 11 of the terminal 10*aa* uses the counterpart information stored in the temporary memory 1011 to call the counterpart terminal 10. With this configuration, even when the terminal 10*aa* needs to call again the counterpart terminal 10*af* after calling the counterpart terminal 10*af*, the user does not have to input the counterpart information again. Further, since the counterpart information is only temporarily stored for a limited time period, the security level is maintained. For example, the call log manager 21 of the terminal 10*aa* may delete the counterpart information in the call log temporary memory 1011, when a predetermined time elapses after such information is stored.

The display control 16 of the terminal 10*aa* causes the display 120*aa* to display counterpart information, which is stored in the call log management DB 1001, for example, on a screen that requests the terminal 10*aa* to select a counterpart terminal to start communication with. With this counterpart information, the user does not have to input counterpart information of the counterpart terminal, as long as the counterpart information of the counterpart terminal has been previously stored, for example, at the time when the request for storing a call log is accepted at the first acceptance unit 22.

In this example, the management system 50 is connected with the terminal 10*aa* through the communication network 2, and receives a call request (communication start request) that requests to start communication with the counterpart terminal 10*af*, from the terminal 10*aa*. In response to the call request, the management system 50 controls communication between the terminal 10*aa* and the counterpart terminal 10*af* via the relay device 30.

More specifically, as illustrated in FIG. 10, in the communication system 1, a management information session sei is established between the terminal 10*aa* and the counterpart terminal 10*af* through the management system 50, through which various management information is transmitted or received. Further, a content data session sed is established between the terminal 10*aa* and the counterpart terminal 10*af* via the relay device 30, through which content data, such as image data and sound data, is transmitted or received.

Figure 11:
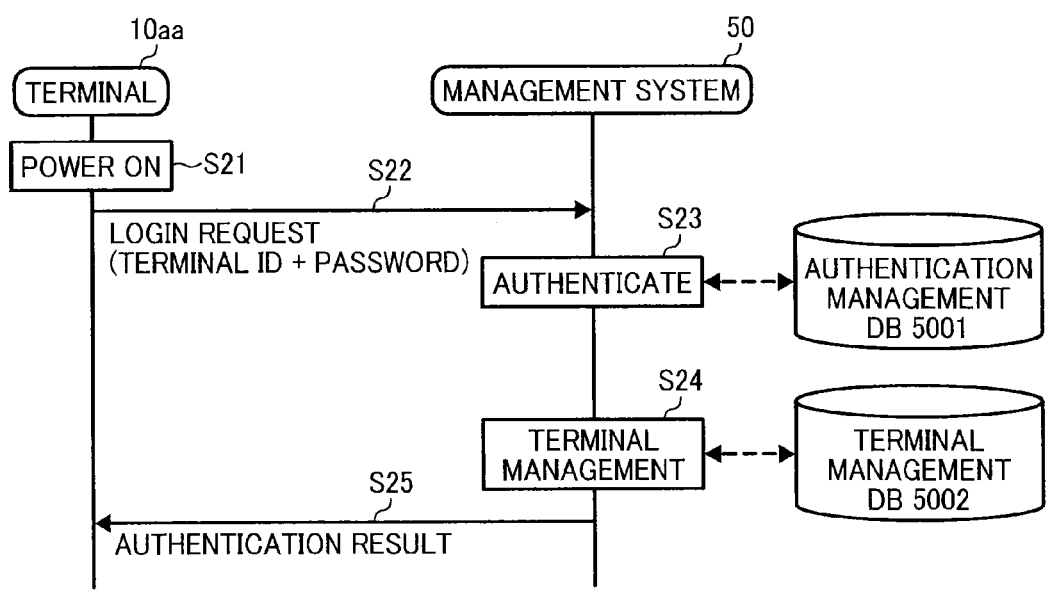
FIG. 11 is a data sequence diagram illustrating operation of preparing for starting communication between the communication terminals, according to an example embodiment of the present invention.

Next, each process discussed above as the overview will be described more specifically by discussing a series of processes of the embodiment using FIGS. 11 to 17. FIG. 11 is a sequence diagram illustrating operation of preparing for starting communication between the terminal 10*aa* and the counterpart terminal 10*af*. In FIG. 11, various management information is transmitted through a management information session sei.

As the user turns on the power switch 109 (FIG. 3), at S21, the operation input 12 of FIG. 5 turns on the power of the terminal 10*aa*. In response to turning on of the terminal 10*aa*, at S22, the login request 13 automatically causes the data transmitter/receiver 11 to transmit login request information that requests to login, to the management system 50 through the communication network 2. The login request information includes the terminal ID for identifying the terminal 10*aa*, which is the terminal requesting to login, and a password. The data processor 19 may read the terminal ID and password, from the nonvolatile memory 1000, and transmit the terminal ID and password to the data transmitter/receiver 11. With the login request information, the terminal 10aa may send the IP address of the terminal 10aa, such that the management system 50 is able to know the IP address of the terminal 10aa.

At S23, the authenticator 52 of the management system 50 searches the authentication management DB 5001 (FIG. 7) in the nonvolatile memory 5000 using the terminal ID and password included in the login request information received at the data transmitter/receiver 51, as a search key, to determine whether the terminal 10aa is an authenticated terminal. At S24, in the case where the authenticator 52 determines that the terminal 10aa is an authenticated terminal, as the terminal ID and the password in the login request information are managed, the terminal manager 53 stores the operation state of the terminal 10aa in each record indicated by the terminal ID and the terminal name of the terminal 10aa in the terminal management DB 5002 (FIG. 8). Accordingly, the operation state "online" is managed in association with the terminal ID "01aa" in the terminal management table of FIG. 8.

At S25, the data transmitter/receiver 51 of the management system 50 sends the authentication result of the authenticator 52, to the terminal 10aa that requests to login, through the communication network 2. In this example, it is assumed that the authentication result indicates that the terminal 10aa is an authenticated terminal.

The above-described operation of preparing for communication is performed for the the counterpart terminal 10af, as the terminal 10af is turned on.

Figure 12A:
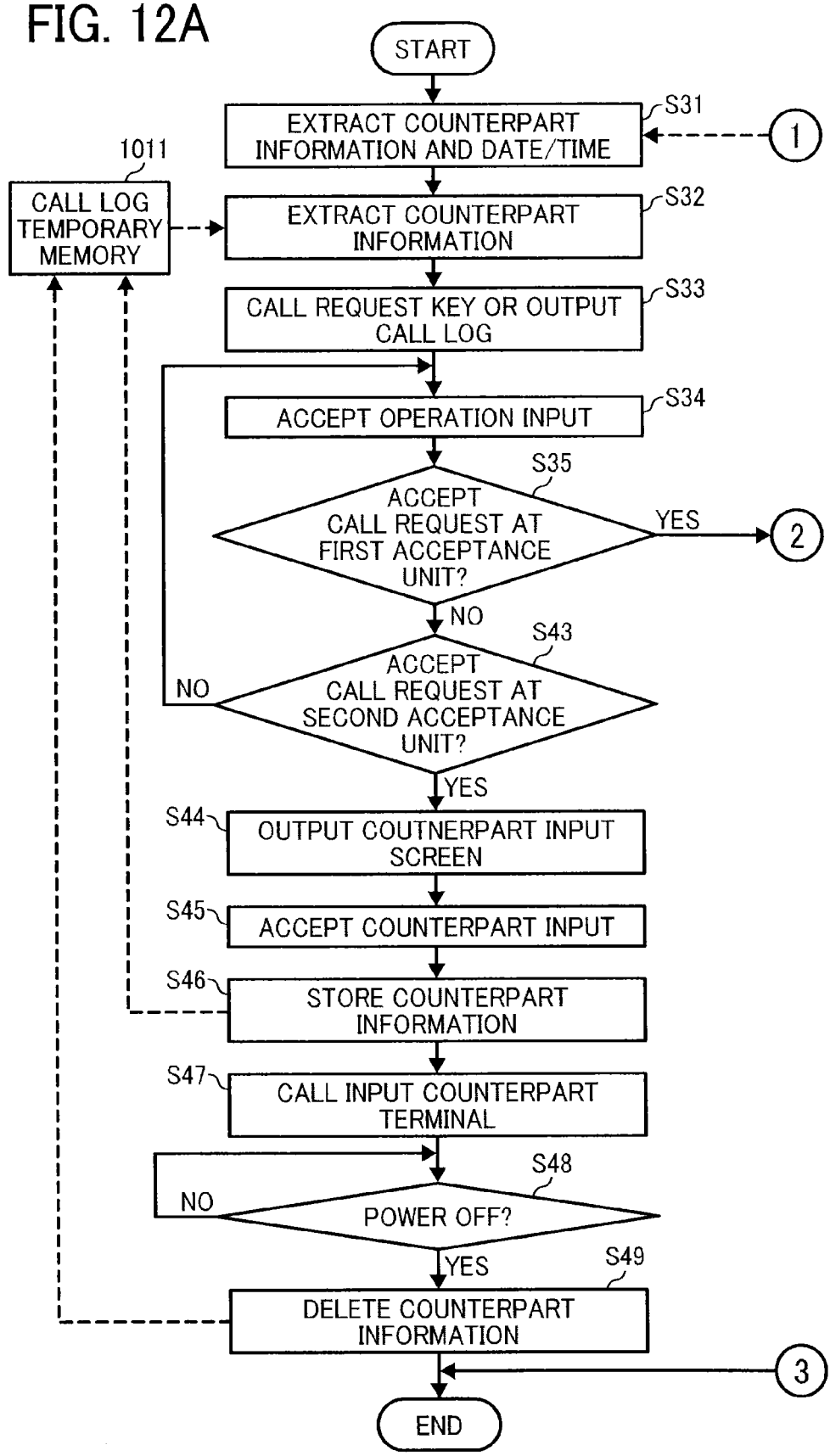
FIGS. 12A and 12B are a flowchart illustrating operation of managing counterpart information, while processing a call request, according to an example embodiment of the present invention.
Figure 12B:
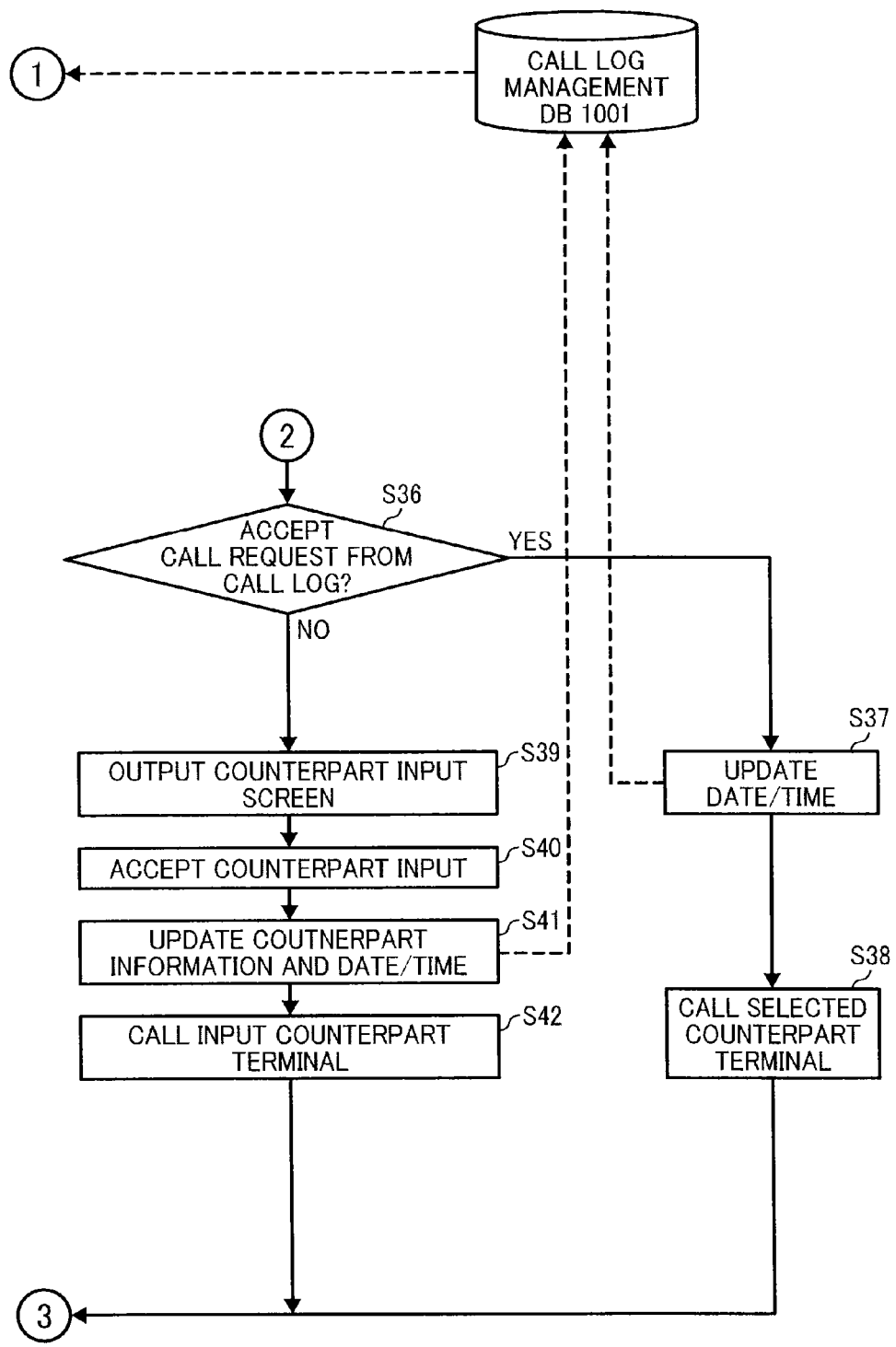

Referring to FIGS. 12A and 12B, operation of managing counterpart information, in response to a call request for starting communication with the counterpart terminal 10af, performed by the terminal 10aa, is explained according to an example embodiment of the present invention. The operation of FIG. 12 may be performed, when the login process by the terminal 10aa is completed.

At S31, the extractor 17 of the terminal 10aa searches the call log management DB 1001 (FIG. 6) to extract time information and counterpart information, which are stored as a log of call requests (communication start requests) requested by the terminal 10aa.

At S32, the extractor 17 of the terminal 10aa searches the call log temporary memory 1011 of the nonvolatile memory 1000 to extract the counterpart information, which is stored at the time when a previous call request is received.

Figure 13:
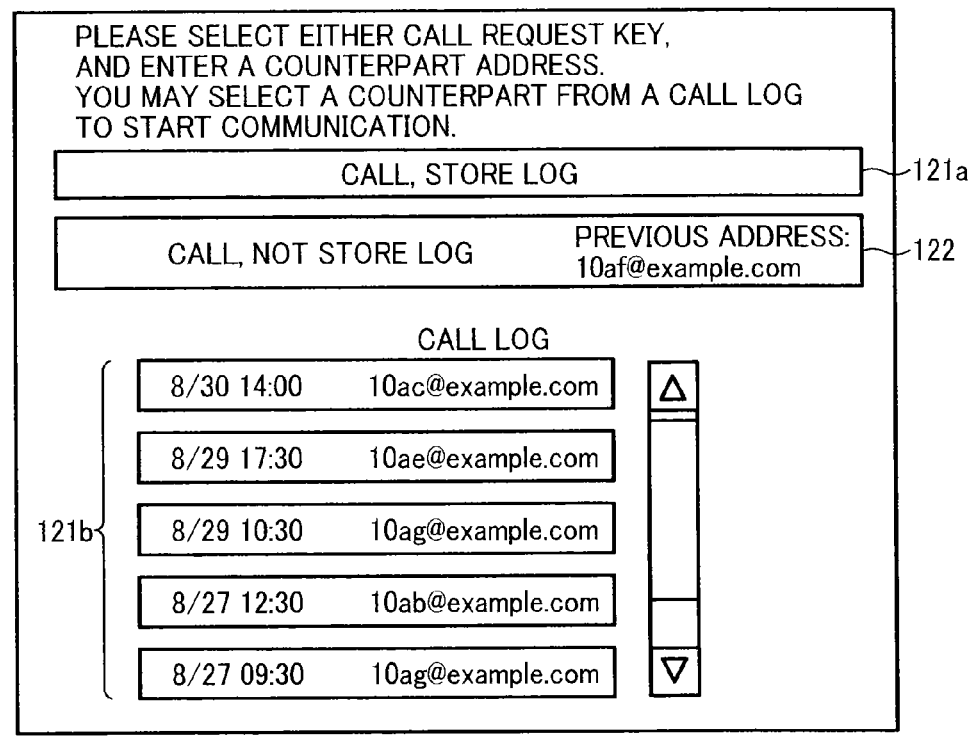
FIG. 13 is an illustration of an example call request screen.
Figure 14:
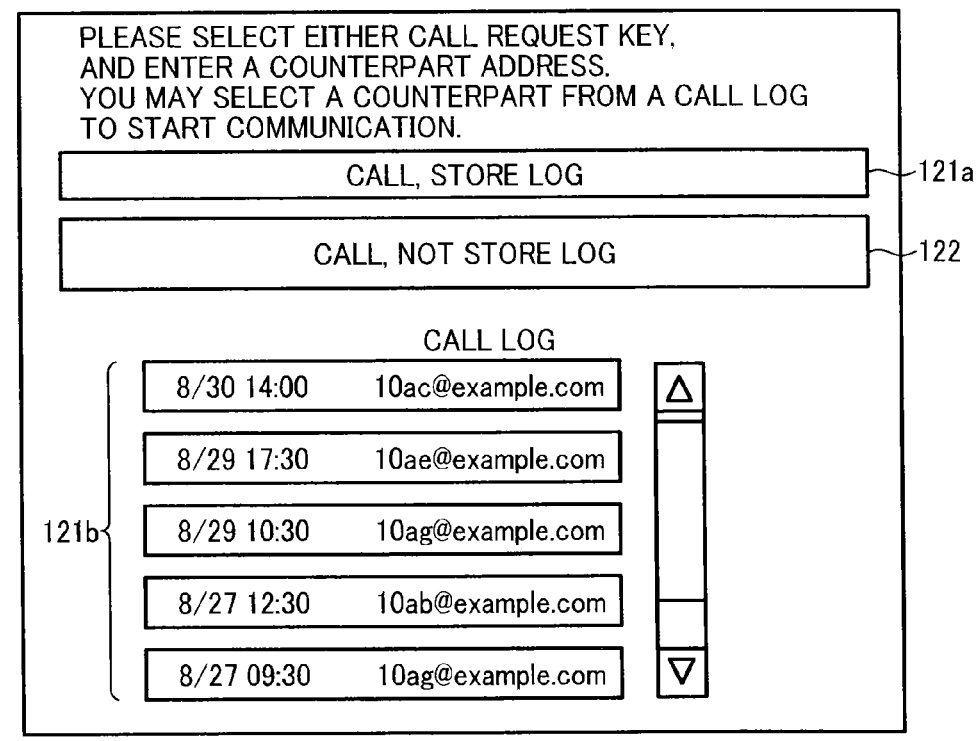
FIG. 14 is an illustration of an example call request screen.

At S33, the display control 16 causes the display 120aa to display a call request acceptance screen of FIG. 13 or FIG. 14. FIGS. 13 and 14 each illustrate an example call request acceptance screen. The call request acceptance screen displays thereon a plurality of call request keys 121b, each of which is displayed with the time information and the counterpart information, which are extracted from the call log management DB 1001, at S31. The call request acceptance screen further displays a call request key 122. In one example, when the counterpart information is extracted from the call log temporary memory 1011 at S32, such extracted counterpart information is displayed on the call request key 122 as illustrated in FIG. 13. When the counterpart information is not extracted from the call log temporary memory 1011 at S32, the call request key 122 does not display any counterpart information as illustrated in FIG. 14.

At S34, the call request acceptance unit 20 receives a user input that request to start communication ("call request"), through the operation key 108 operated by the user.

At S35, the call request acceptance unit 20 determines whether the call request is accepted at the first acceptance unit 20a. When it is determined that the call request is accepted at the first acceptance unit 20a ("YES" at S35), the operation proceeds to S36. More specifically, when the call request key 121a or 121b is selected, the first acceptance unit 20a of the call request acceptance unit 20 accepts a request for starting communication, with a request for storing a call log for the communication to be started. In such case, the operation proceeds to S36.

At S36, the call request acceptance unit 20 determines whether a call request requests to start communication using a call log. In particular, when the call request key 121b is selected, the first acceptance unit 20a accepts a call request for starting communication with the counterpart terminal having the counterpart information displayed on the key 121b. In such case ("YES" at S36), the operation proceeds to S37. At S37, the call request manager 21 refers to the call log management DB 1001 (FIG. 6) to update the time, which is stored in association with the counterpart information being displayed on the selected call request key 121b, with the time at which the call request is accepted. In alternative to updating the time information, at S37, the call log manager 21 may store the time at which the call request is accepted, in association with the counterpart information, as a new record in the call log management DB 1001. In such case, a plurality of records including the same counterpart information may be stored, every time the communication is requested for the same counterpart terminal.

At S38, the data transmitter/receiver 11 of the terminal 10aa processes a call request, by transmitting a call request (communication start request) to the counterpart terminal 10af, using any desired method.

Figure 15:
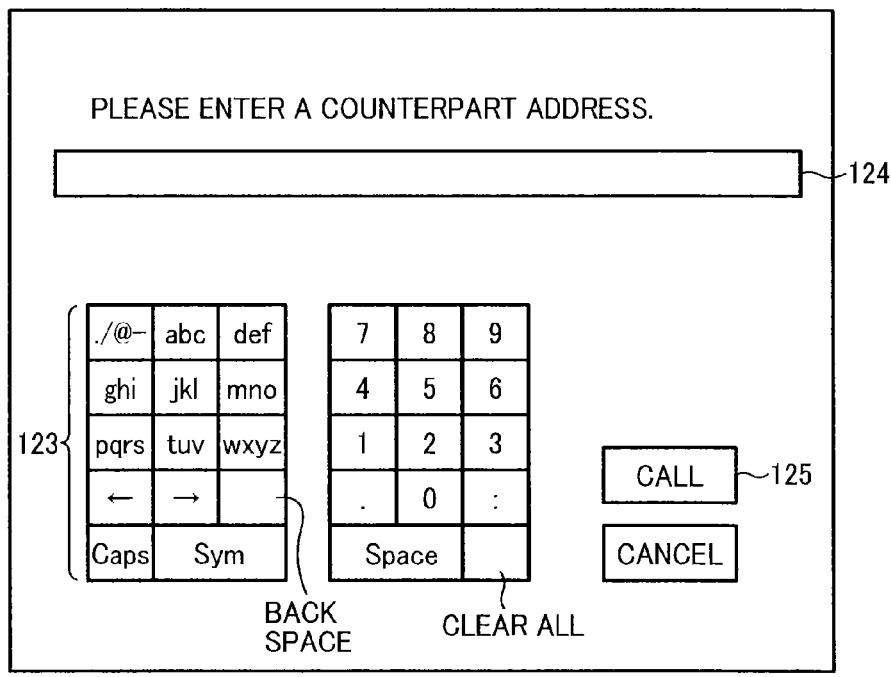
FIG. 15 is an illustration of an example counterpart input screen.

When the call request is accepted at the first acceptance unit 20a ("YES" at S35), and the call request key 121a is selected ("NO" at S36), the operation proceeds to S39. At S39, the display control 16 causes the display 120aa to display a counterpart input acceptance screen of FIG. 15. FIG. 15 illustrates an example counterpart input acceptance screen. The user at the terminal 10aa operates the operation keys 108 to select a desired character key 123, to input characters or numerals of counterpart information for the counterpart terminal 10af. The input counterpart information is displayed in a display field 124. When the "CALL" key 125 is selected, at S40, the operation input 12 accepts an input of counterpart information.

At S41, the call log manager 21 refers to the call log management DB 1001 (FIG. 6) to store the time at which the call request is accepted, and counterpart information that is input, in association with each other.

At S42, the data transmitter/receiver 11 of the terminal 10aa processes a call request, by transmitting a call request (communication start request) to the counterpart terminal 10af, using any desired method.

Referring back to S35, when the call request acceptance unit 20 determines that the call request is accepted at the second acceptance unit 20b ("NO" at S35, and "YES" at S43), the operation proceeds to S44. More specifically, when the call request key 122 is selected, the second acceptance unit 20b receives the call request.

At S44, the display control 16 causes the display 120aa to display a counterpart input acceptance screen of FIG. 15. The user at the terminal 10aa operates the operation keys 108 to select a desired character key 123, to input characters or numerals of counterpart information for the counterpart terminal 10af. The input counterpart information is displayed in a display field 124. When the "CALL" key 125 is selected, at S45, the operation input 12 accepts an input of counterpart information.

Figure 16:
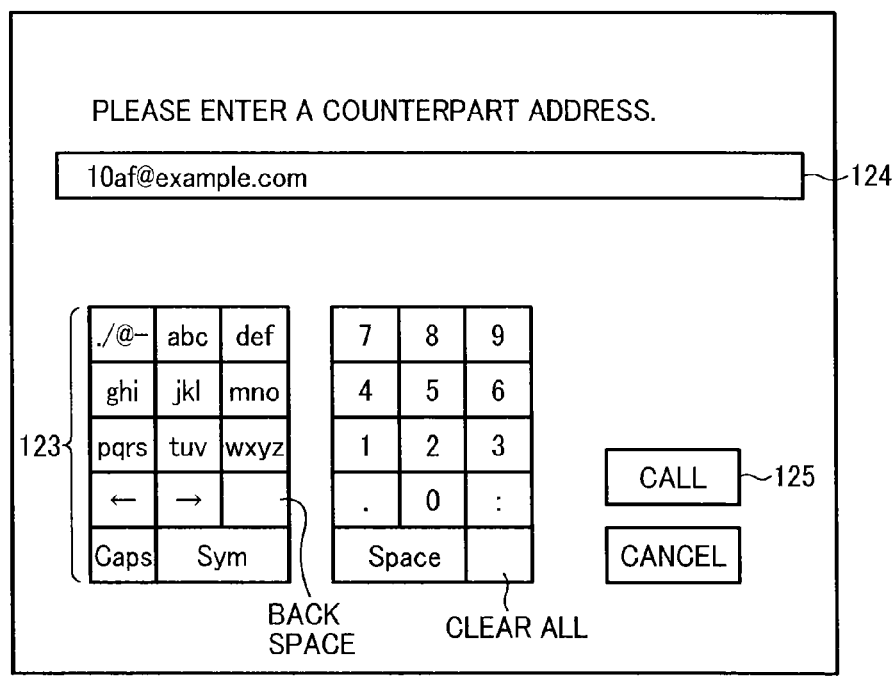
FIG. 16 is an illustration of an example counterpart input screen.

In case where the call request key 122 of FIG. 13, with the counterpart information being displayed, is selected, at S44, the display control 16 causes the display 120aa to display a counterpart input acceptance screen of FIG. 16. The display field 124 already displays therein the counterpart information, which is extracted from the call log temporary memory 1011. In this manner, the user at the terminal 10aa does not have to input the counterpart information of the counterpart terminal 10af.

At S46, the call log manager 21 temporarily stores the counterpart information accepted at the operation input 12 in the call log temporary memory 1011 of the volatile memory 1010. When the call log temporary memory 1011 is stored with counterpart information, which corresponds to the previous call request, such data is overwritten with the newly input (or newly selected) counterpart information.

At S47, the data transmitter/receiver 11 of the terminal 10aa processes a call request, by transmitting a call request (communication start request) to the counterpart terminal 10af, using any desired method.

At S48, when the power switch 109 is selected to turn off the terminal 10aa, the operation input 12 turns off the power of the terminal 10aa. At S49, as the power of the terminal 10aa is turned off, the counterpart information stored in the call log temporary memory 1011 of the nonvolatile memory 1010 is deleted.

Alternatively, irrespective of whether the power of the terminal 10aa is turned off, the call log manager 21 of the terminal 10aa may delete the counterpart information, which is temporarily stored in the call log temporary memory 1011, when a predetermined time period elapses after the time when the call request is accepted. The predetermined time period may be set to, for example, 10 minutes, 30 minutes, or 1 hour. Alternatively, the counterpart information may be deleted when the application accepting the call request is closed, when the communication with the counterpart terminal starts, or when the communication with the counterpart terminal ends.

Figure 17:
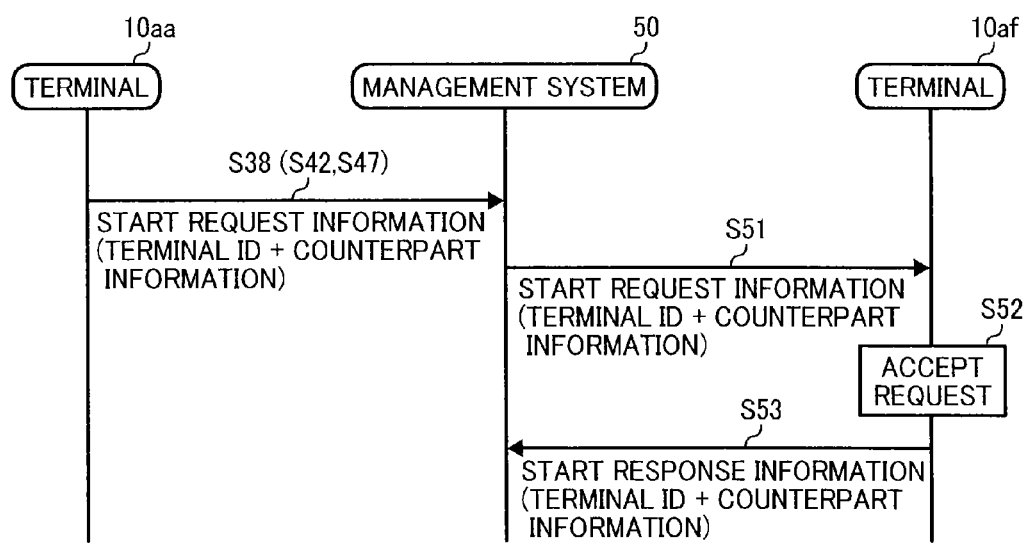
FIG. 17 is a data sequence diagram illustrating operation of calling.

Referring to FIG. 17, operation of processing a communication start request is explained according to an example embodiment of the present invention.

At any of S38, S42, and S47, the terminal 10aa transmits a communication start request to the management system 50, which requests to start communication with the counterpart terminal 10af. The communication start request includes the terminal ID "01aa" of the terminal 10aa that requests to start communication, and the counterpart information "10af@example.com" of the counterpart terminal 10af.

At S51, the data transmitter/receiver 51 of the management system 50 transmits the communication start request to the counterpart terminal 10af.

As the communication start request is received at the data transmitter/receiver 11 of the counterpart terminal 10af, at S52, the operation input 12 of the terminal 10af requests the user at the counterpart terminal 10af to accept the communication start request. In this example, it is assumed that the communication start request is accepted.

At S53, the data transmitter/receiver 11 of the counterpart terminal 10af transmits communication start response, which indicates approval to start communication, to the management system 50. The communication start response includes the terminal ID of the terminal 10aa that requests for communication, and the counterpart information of the counterpart terminal 10af.

In response to the communication start response indicating approval to start communication, the management system 50 controls connections between the terminal 10aa an the terminal 10af via the relay device 30, under control of the CPU 201. As described above, a content data session sed is established between the terminal 10aa and the terminal 10af via the relay device 30 to transmit or receive image data and sound data, for example, as described in the description related to FIGS. 2 and 3A to 3C of U.S. Patent Application Publication No. 2013-0223292, the contents of which is incorporated herein by reference.

The relay devices 30, the management system 50, the program providing system 90, and the maintenance system 100 in the above-described embodiment may be configured by a single computer or a plurality of computers to which divided portions (functions) are arbitrarily allocated. In addition, in the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a recording medium storing the terminal program, relay device program, communication management program, or communication terminal management program in the above-described embodiment, the HD 204 storing these programs, and the program providing system 90 including the HD 204 are used in the case where they are provided as program products at home or abroad to the users of the above-described terminal program, relay device program, communication management program, and communication terminal management program.

In addition, although the case of a video conference system has been described as an example of the communication system 1 in the above-described embodiment, the embodiment is not limited to this case, and the communication system 1 may be a phone system such as an Internet Protocol (IP) phone system or an Internet phone system. In addition, the communication system 1 may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car.

Further, the communication system 1 may be a cellular phone communication system. In this case, for example, the terminals 10 correspond to cellular phones.

In addition, although image data serving as sight data and sound data serving as hearing data are described as examples of content data in the above-described embodiment, the content data is not limited to these items of data, and the content data may be other five-sense data. For example, in the case where the content data is touch data, a sensation obtained by a user's contact at one terminal side is transmitted to the other terminal side. Further, in the case where the content data is smell data, a smell at one terminal side is transmitted to the other terminal side. In addition, in the case where the content data is taste data, a taste at one terminal side is transmitted to the other terminal side.

Further, it is sufficient for the content data to be at least one of image (sight) data, sound (hearing) data, touch data, smell data, and taste data.

In addition, although the case in which a video conference is held by the communication system 1 has been described in the above-described embodiment, the embodiment is not limited to this case. The communication system 1 may be used in meetings, general conversations between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A communication terminal, comprising:
   processing circuitry configured to
     receive a user input at a user interface that includes a first input portion and a second input portion that is separate from the first input portion,
     accept a communication start request at the user interface for starting communication with a counterpart terminal indicated by counterpart information, through one of the first input portion and the second input portion of the user interface, wherein the processing circuitry is configured to allow the user to subsequently input the counterpart information when an input is received at either one of the first input portion and the second input portion;
   a transmitter that sends a communication start request to the counterpart terminal through a network, using the counterpart information of the counterpart terminal; and
   a first memory that stores log data regarding one or more counterpart terminals that have been requested by the communication terminal to start communication,
   wherein the processing circuitry is configured to
     accept the inputted counterpart information and store the counterpart information of the counterpart terminal in the first memory as log data, when the communication start request is accepted through the first input portion, and
     accept the inputted counterpart information without storing the counterpart information of the counterpart terminal in the first memory as log data, when the communication start request is accepted through the second input portion.

2. The communication terminal of claim 1, further comprising:
   a second memory that temporarily stores the counterpart information of the counterpart terminal, when the communication start request is accepted through the second input portion,
   wherein the processing circuitry further deletes the counterpart information in the second memory when a predetermined time period elapses from a time when the communication start request is accepted.

3. The communication terminal of claim 2, wherein, when a communication start request for starting communication with the counterpart terminal is additionally accepted at the second input portion, before the counterpart information of the counterpart terminal is deleted,
   the processing circuitry sends the counterpart information of the counterpart terminal read from the second memory, to the transmitter to cause the transmitter to send the communication start request to the counterpart terminal using the counterpart information of the counterpart terminal that is read from the second memory.

4. The communication terminal of claim 2, wherein
   the user interface further displays a screen that allows the user to input the communication start request, the screen being configured to display:
   a first component to function as the first input portion, which, when selected, accepts the communication start request with a request for storing the counterpart information as log data; and
   a second component to function as the second input portion, which, when selected, accepts the communication start request without storing the counterpart information as log data.

5. The communication terminal of claim 4, wherein
   the second component displays thereon the counterpart information of the counterpart terminal read from the second memory.

6. The communication terminal of claim 4, wherein the screen is further configured to display:

a third component that displays thereon counterpart information of the one or more counterpart terminals that have been requested by the communication terminal to start communication, based on the log data stored in the first memory, and when the user interface receives user selection that selects the third component associated with one of the one or more counterpart terminals, the processing circuitry causes the transmitter to send a communication start request to the counterpart terminal associated with the selected third component, using the counterpart information of the communication terminal associated with the selected third component that is read from the first memory.

7. The communication terminal of claim 2, wherein the first memory is a nonvolatile memory and the second memory is a volatile memory.

8. A communication system, comprising:
the communication terminal of claim 1; and
a communication management sub-system that controls communication established between the communication terminal and the counterpart terminal.

9. A non-transitory recording medium storing a plurality of instructions which, when executed by a communication terminal, cause the communication terminal to perform a method comprising:
receiving a user input at a user interface that includes a first input portion and a second input portion that is separate from the first input portion,
accepting a communication start request at the user interface for starting communication with a counterpart terminal indicated by counterpart information, through one of the first input portion and the second input portion of the user interface, wherein the processing circuitry is configured to allow the user to subsequently input the counterpart information when an input is received at either one of the first input portion and the second input portion;
sending a communication start request to the counterpart terminal through a network, using the counterpart information of the counterpart terminal; and
accepting the inputted counterpart information and storing the counterpart information of the counterpart terminal in a first memory as log data, when the communication start request is accepted through the first input portion, and
accepting the inputted counterpart information without storing the counterpart information of the counterpart terminal in the first memory as log data, when the communication start request is accepted through the second input portion.

10. A method implemented by a communication terminal comprising:
receiving a user input at a user interface that includes a first input portion and a second input portion that is separate from the first input portion,
accepting a communication start request at the user interface for starting communication with a counterpart terminal indicated by counterpart information, through one of the first input portion and the second input portion of the user interface, wherein the processing circuitry is configured to allow the user to subsequently input the counterpart information when an input is received at either one of the first input portion and the second input portion;
sending a communication start request to the counterpart terminal through a network, using the counterpart information of the counterpart terminal; and
accepting the inputted counterpart information and storing the counterpart information of the counterpart terminal in a first memory as log data, when the communication start request is accepted through the first input portion, and
accepting the inputted counterpart information without storing the counterpart information of the counterpart terminal in the first memory as log data, when the communication start request is accepted through the second input portion.

* * * * *